(No Model.)

J. B. SARGENT.
BENCH HOOK.

No. 314,058. Patented Mar. 17, 1885.

Witnesses:
Jos. B. Sargent,
Inventor
By atty

UNITED STATES PATENT OFFICE.

JOSEPH B. SARGENT, OF NEW HAVEN, CONNECTICUT, ASSIGNOR TO SARGENT & CO., OF SAME PLACE.

BENCH-HOOK.

SPECIFICATION forming part of Letters Patent No. 314,058, dated March 17, 1885.

Application filed January 12, 1885. (No model.)

*To all whom it may concern:*

Be it known that I, JOSEPH B. SARGENT, of New Haven, in the county of New Haven and State of Connecticut, have invented a new Improvement in Bench-Hooks; and I do hereby declare the following, when taken in connection with accompanying drawings and the letters of reference marked thereon, to be a full, clear, and exact description of the same, and which said drawings constitute part of this specification, and represent, in—

Figure 1:
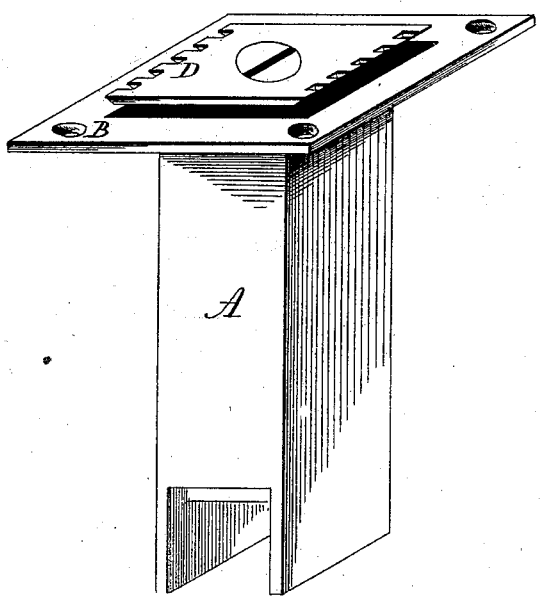
Figure 2:
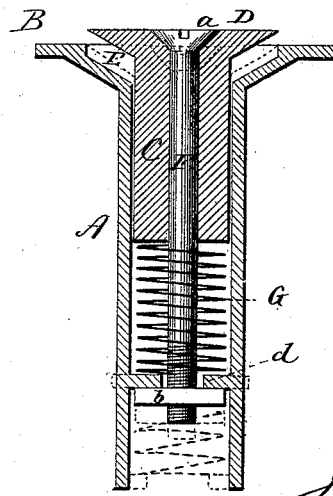

Figure 1, a perspective view showing the hook as slightly raised; Fig. 2, a vertical central section of the same.

This invention relates to an improvement in the article used by joiners and others as a stop on their bench, against which the material may abut, as in the act of planing, &c., commonly called "bench-hook." These hooks are necessarily adjustable to different elevations, and must also be constructed so as to be dropped flush with the surface of the bench. It is desirable that the hook shall be held rigidly against any raising influence of the work against it, and it also should be so arranged that it may readily be driven down under any force upon it. Many hooks are made to answer these purposes; but generally some adjustment of the hook is necessary in order to permit its depression, and then, when depressed, a readjustment is necessary.

The object of my invention is the construction of a hook which will return to its proper elevation when any force which caused it to drop is removed; and the invention consists in a socket constructed to receive the shank of the hook, and having its upper end recessed to receive the head of the hook, combined with the hook, a screw working vertically through the hook into a nut below, the said nut supported from its upper surface, but permitted free movement with the screw downward, with a spring arranged, the tendency of which is to force the spring upward to bring the nut to a bearing, but yet yield to any downward pressure upon the head of the hook, as more fully hereinafter described.

A represents the socket, which is preferably square, constructed with a flange, B, around its upper edge to afford a convenient means of attaching the socket to the bench, the socket extending down through a hole in the bench, as in the usual construction of hooks.

C is the shank of the hook, its upper end constructed to form the head D, and should be so as to present sharp or toothed edges, as in the usual construction.

The flanged end of the socket is constructed with a recess, E, corresponding to the head of the hook.

Vertically through the hook is a screw, F. This screw is best made with a slotted conical head, *a*, the upper face of the head countersunk to correspond to the head of the screw, as seen in Fig. 2. The screw extends down below the hook, and at its lower end a nut, *b*, is applied.

Between the lower end of the hook and the nut a stop, *d*, is arranged, against the under side of which the nut may bear, and between the stop *d* and the lower end of the hook C a spring, G, (preferably a helical spring,) is arranged, one end resting on the stop *d* and the other against the lower end of the shank, the tendency of which is to raise the hook, but yet yield to a pressure upon the head of the hook, and so that such pressure applied to the head of the hook will force the hook, screw, and its nut downward, as indicated in broken lines, Fig. 2, the nut leaving its bearing upon the stop in such descent.

If adjustment be required—say as for a greater elevation of the hook—then the screw F is turned to withdraw it from its nut *b*, the spring raising the hook as the screw is turned until the desired elevation is attained; or, if it be desired to depress the hook, turn the screw F in the opposite direction to run it into its nut *b*, and such running will draw the hook and its nut downward accordingly; but while the hook is raised above the face of the flange B it is supported by the spring, and so that force applied to the hook will cause it to descend into its socket; but so soon as that force is removed, then the hook will automatically return to the same elevation as before it was so forced downward.

The nut *b* is made angular, corresponding to the shape of the interior of the socket, so that in turning the screw the shape of the nut will prevent its turning with the screw.

While I prefer to arrange the spring above the stop against which the nut bears, it may be arranged below, as indicated in broken lines, Fig. 2; but in this case, in order to make a convenient assembling of the parts, it will be desirable that the stop $d$ be removable. This may be done by making the stop in the form of a pin or pins, as indicated in broken lines, Fig. 2, it only being essential that the nut shall be free from its stop to descend with the hook and screw, and to be returned by the action of the spring, and to permit the hook to descend against the pressure of the spring independent of the screw or nut.

I am aware that a bench-hook has been made resting upon a spring with a screw downward through it into a nut, and so that by turning the screw from above the hook could be adjusted; but I do not claim, broadly, such construction.

I claim—

The combination of the socket A, constructed with a recessed flange, B, at its upper end, and with a stop, $d$, upon its inside, and so as to form an angular recess in the socket below the stop, the head D, adapted to enter the recess in the flange B, the shank of the hook extending down into the socket, the adjusting-screw F vertically through the head and shank, the nut $b$, arranged in the recess below the stop in the socket, and of corresponding angular shape, and a spring arranged in the socket to force the hook upward, but yield to a downward force upon the hook independent of the screw, substantially as described.

JOSEPH B. SARGENT.

Witnesses:
Jos. C. Earle,
J. H. Shumway.